US012568164B2

(12) United States Patent
Weng

(10) Patent No.: US 12,568,164 B2
(45) Date of Patent: Mar. 3, 2026

(54) STAND FOR MOBILE TERMINAL

(71) Applicant: Shenzhen Guangyipeng Technology Co., Ltd., Shenzhen (CN)

(72) Inventor: Jie Weng, Shenzhen (CN)

(73) Assignee: Shenzhen Guangyipeng Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/208,541

(22) Filed: May 14, 2025

(65) Prior Publication Data

US 2025/0365358 A1 Nov. 27, 2025

(30) Foreign Application Priority Data

May 21, 2024 (CN) .......................... 202421120170.9
Mar. 20, 2025 (CN) .......................... 202520503957.1

(51) Int. Cl.
*H04M 1/04* (2006.01)

(52) U.S. Cl.
CPC .................................... *H04M 1/04* (2013.01)

(58) Field of Classification Search
CPC ....... H04M 1/04; A45F 5/1516; H04B 1/3816
See application file for complete search history.

(56) References Cited

U.S. PATENT DOCUMENTS

| | | | | |
|---|---|---|---|---|
| 9,267,638 B2 * | 2/2016 | Le Gette | .............. | H04R 1/1033 |
| 9,470,358 B2 * | 10/2016 | Le Gette | ............... | F16M 13/04 |
| 10,728,754 B2 * | 7/2020 | Lee | ........................ | H04M 1/026 |
| 2003/0089832 A1 * | 5/2003 | Gold | ...................... | F16M 11/10 |
| | | | | 248/454 |
| 2016/0173670 A1 * | 6/2016 | Langhein | ............... | A45C 11/00 |
| | | | | 455/575.1 |
| 2018/0167498 A1 * | 6/2018 | Drakos | .................. | F16M 13/00 |
| 2019/0198212 A1 * | 6/2019 | Levy | .................. | F16M 11/2021 |
| 2021/0211533 A1 * | 7/2021 | Kingsland | .............. | H04M 1/04 |
| 2021/0337057 A1 * | 10/2021 | McCoy | .................. | F16M 11/12 |
| 2022/0337279 A1 * | 10/2022 | Lin | ........................ | A45C 11/00 |
| 2024/0039574 A1 * | 2/2024 | Spar | ...................... | H04M 1/185 |
| 2024/0138537 A1 * | 5/2024 | Small | ..................... | A45C 15/00 |
| 2024/0148120 A1 * | 5/2024 | Bohman | ............... | A45C 11/00 |

* cited by examiner

*Primary Examiner* — Bradley Duckworth

(57) ABSTRACT

A stand for mobile terminal includes a first support, a second support, and a third support. The second and third support bodies are respectively hinged to the first support. The first support is provided with a first accommodation cavity for holding cards. The second support is equipped with a fixing component to secure the position of a mobile terminal device. The second support can be positioned relative to the first support in a first unfolded position and a first retracted position. In the first unfolded position, the second support forms a first angle with the first support. In the first retracted position, the angle between them is smaller than the first angle. The third support can be positioned relative to the first support in a second unfolded position and a second retracted position.

20 Claims, 17 Drawing Sheets

20

207

43

STAND FOR MOBILE TERMINAL

CROSS-REFERENCE TO RELATED APPLICATIONS

The present application claims priority of Chinese Patent Application No. 202421120170.9, filed on May 21, 2024, and Chinese Patent Application No. 202520503957.1, filed on Mar. 20, 2025, the entire contents of which are hereby incorporated by reference.

TECHNICAL FIELD

The present disclosure relates to the technical field of mobile terminal support devices, and more specifically, to a stand for mobile terminals.

BACKGROUND

Existing stands for mobile terminals, such as mobile phone stands, primarily serve to support mobile phones. They have a single function and lack a card accommodation feature. As a result, users need to carry card cases in addition to the stand when traveling, which is inconvenient. Moreover, most stands only have a simple folding foot, resulting in a single support state. Although some mobile phone stands are equipped with card cases, their card-holding capacity is limited.

SUMMARY

The present disclosure provides a stand for mobile terminal that can solve or at least alleviate the aforementioned technical problems.
A Stand for Mobile Terminal, Includes:
- a first support defining a first accommodation cavity for holding cards;
- a second support pivotally connected to the first support and capable of being positioned relative to the first support in a first unfolded position and a first retracted position; wherein in the first unfolded position, the second support forms a first angle with the first support; in the first retracted position, an angle between the second support and the first support is smaller than the first angle; the second support includes a fixing component for securing a position of a mobile terminal device; and
- a third support pivotally connected to the first support and capable of being positioned relative to the first support in a second unfolded position and a second retracted position; wherein in the second unfolded position, the third support forms a second angle with the first support; in the second retracted position, an angle between the third support and the first support is less than the second angle.

The stand for mobile terminal according to embodiments of the present disclosure features a first accommodation cavity in the first support for holding cards. The fixing component limits the position of the mobile terminal device relative to the second support. Additionally, with the first support, second support, and third support, and the fact that the second support and the third support each has its own deployed and retracted positions, the stand can be formed into a variety of support states. By adjusting the stand between different support states, the height or angle of the mobile terminal device can be adjusted to meet diverse support requirements.

DESCRIPTION OF EMBODIMENTS

The technical solutions of the present disclosure will be clearly and completely described below in conjunction with the accompanying drawings, and it is clear that the embodiments described are a portion of the embodiments of the present disclosure, not all of them.

Figure 1:
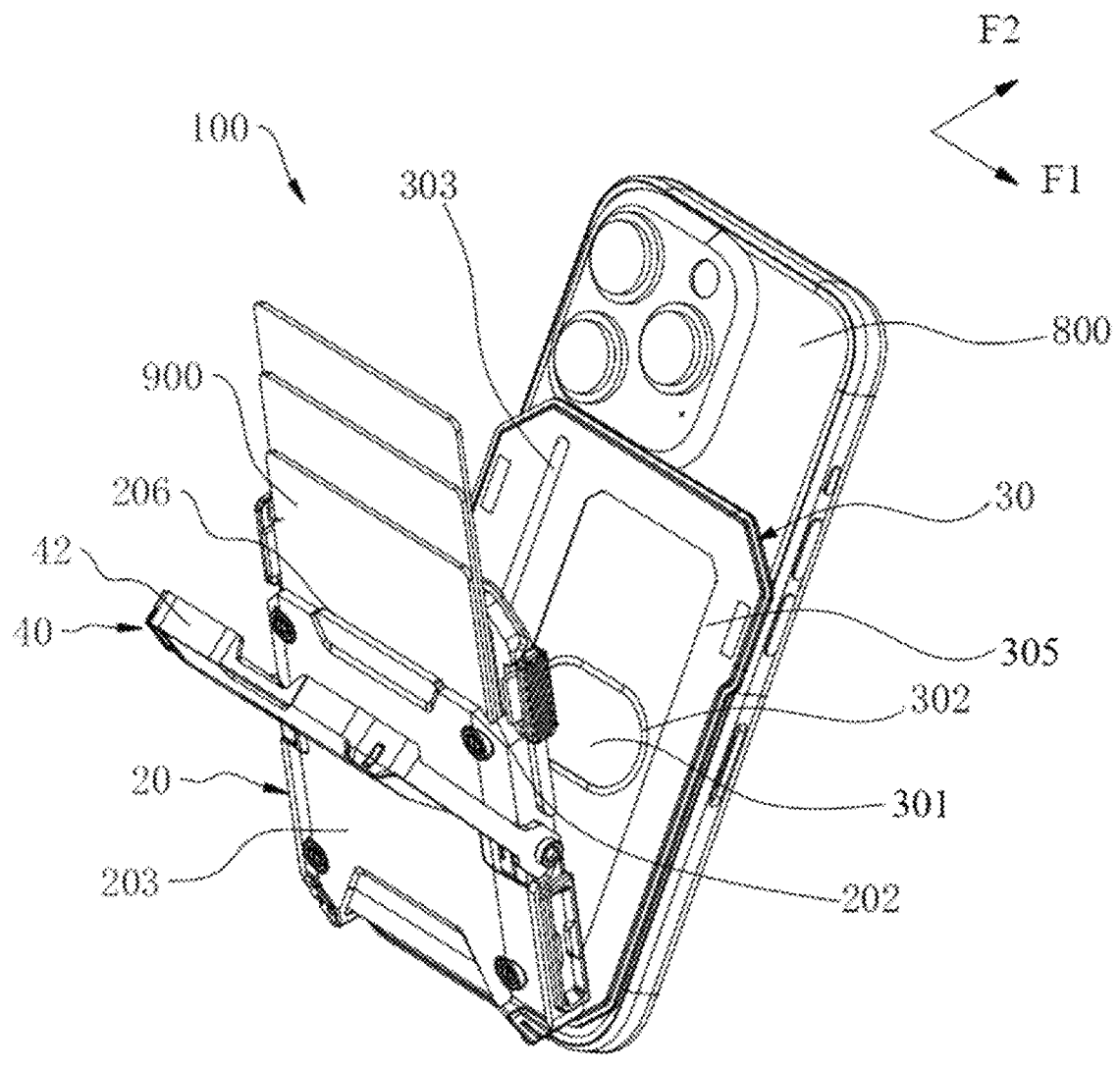
FIG. 1 is a three-dimensional schematic diagram of the stand for mobile terminal of one embodiment of the present disclosure when attached with a mobile terminal device.

As shown in FIG. 1, the present disclosure provides a stand for mobile terminal 100 for supporting a mobile terminal device 800 and keeping it at a certain angle or height relative to the support plane. The mobile terminal device 800 can be a mobile phone or a tablet computer.

Figure 2:
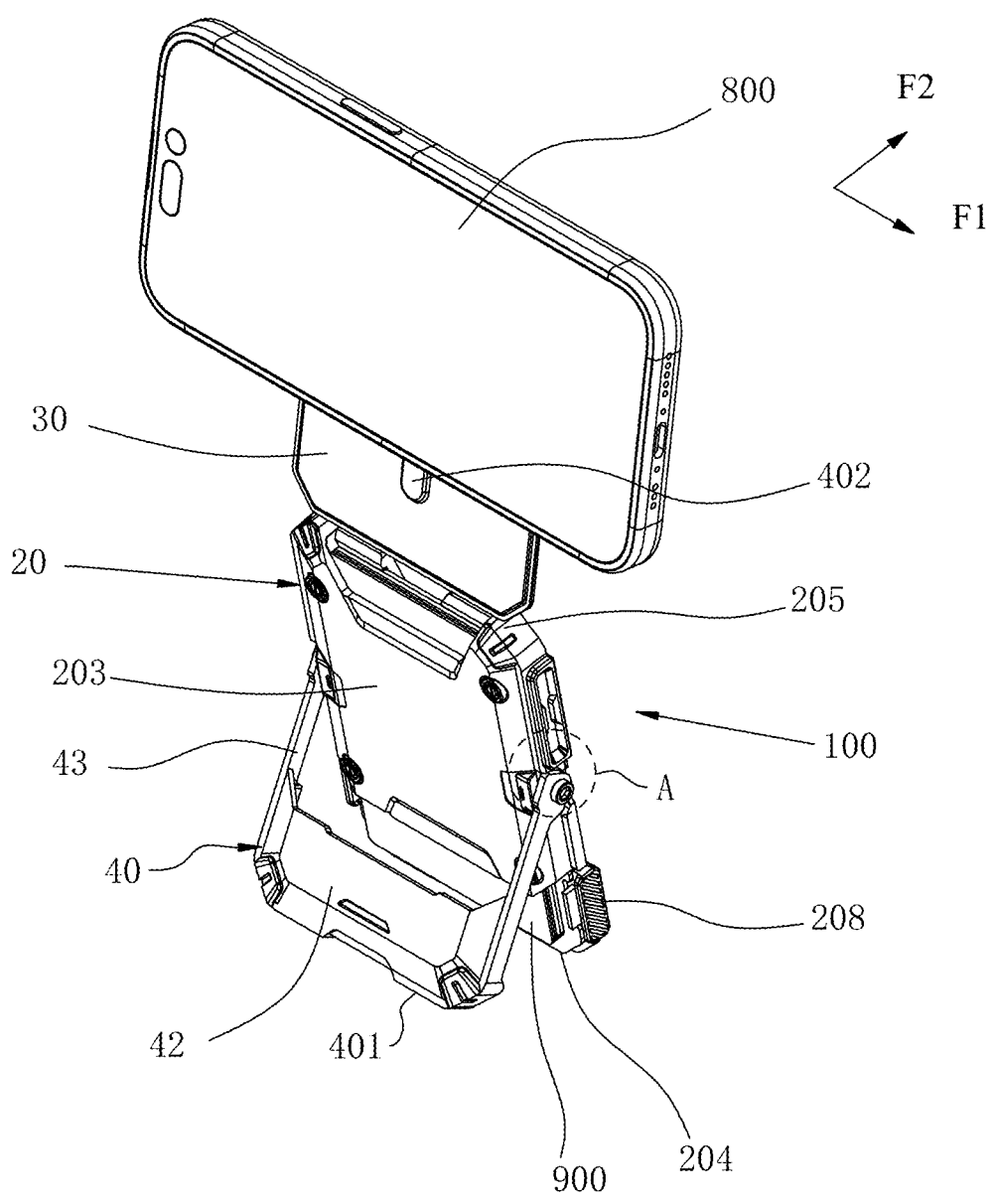
FIG. 2 is a three-dimensional schematic diagram of the stand for mobile terminal of FIG. 1 in a first support state.
Figure 4:
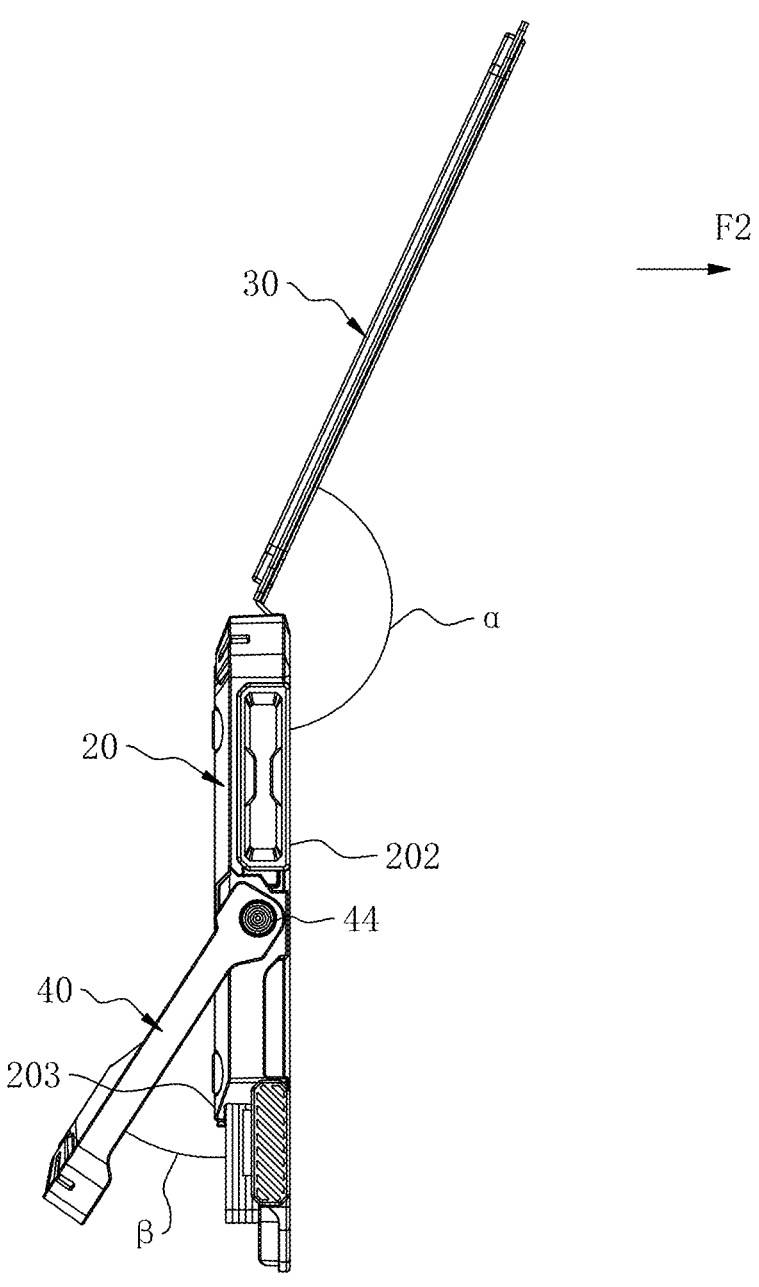
FIG. 4 is a side view of the stand for mobile terminal of FIG. 2.

In some embodiments, as shown in FIGS. 1, 2, and 4, the stand for mobile terminal 100 includes a first support 20, a second support 30, and a third support 40. The second support 30 and the third support 40 are respectively pivotally connected to the first support 20. The first support 20 is provided with a first accommodation cavity 201 for holding cards 900. The second support 30 is provided with a fixing component 50 to secure the position of the mobile terminal device 800. The second support 30 can be positioned relative to the first support 20 in a first unfolded position and a first retracted position. In the first unfolded position, the second support 30 forms a first angle α with the first support 20. In the first retracted position, the angle between the second support 30 and the first support 20 is smaller than the first angle α. The third support 40 can be positioned relative to the first support 20 in a second unfolded position and a second retracted position. In the second unfolded position, the third support 40 forms a second angle β with the first support 20. In the second retracted position, the angle between the third support 40 and the first support 20 is smaller than the second angle β.

The stand for mobile terminal 100 of the present disclosure features a first accommodation cavity 201 in the first support 20 for holding cards 900. The fixing component 50 can secure the mobile terminal device 800 relative to the second support 30. Additionally, with the first support 20, second support 30, and third support 40, and the fact that the second support 30 and the third support 40 each have their own deployed and retracted positions, the stand 100 can form various support states. By adjusting the stand 100 between different support states, the height or angle of the mobile terminal device 800 can be adjusted to meet diverse support requirements.

Exemplarily, the card 900 can be a bank card, credit card, business card, or other items of similar size.

Exemplarily, the first support 20, second support 30, and third support 40 are made of silicone in the form of plates or sheets.

Figure 5:
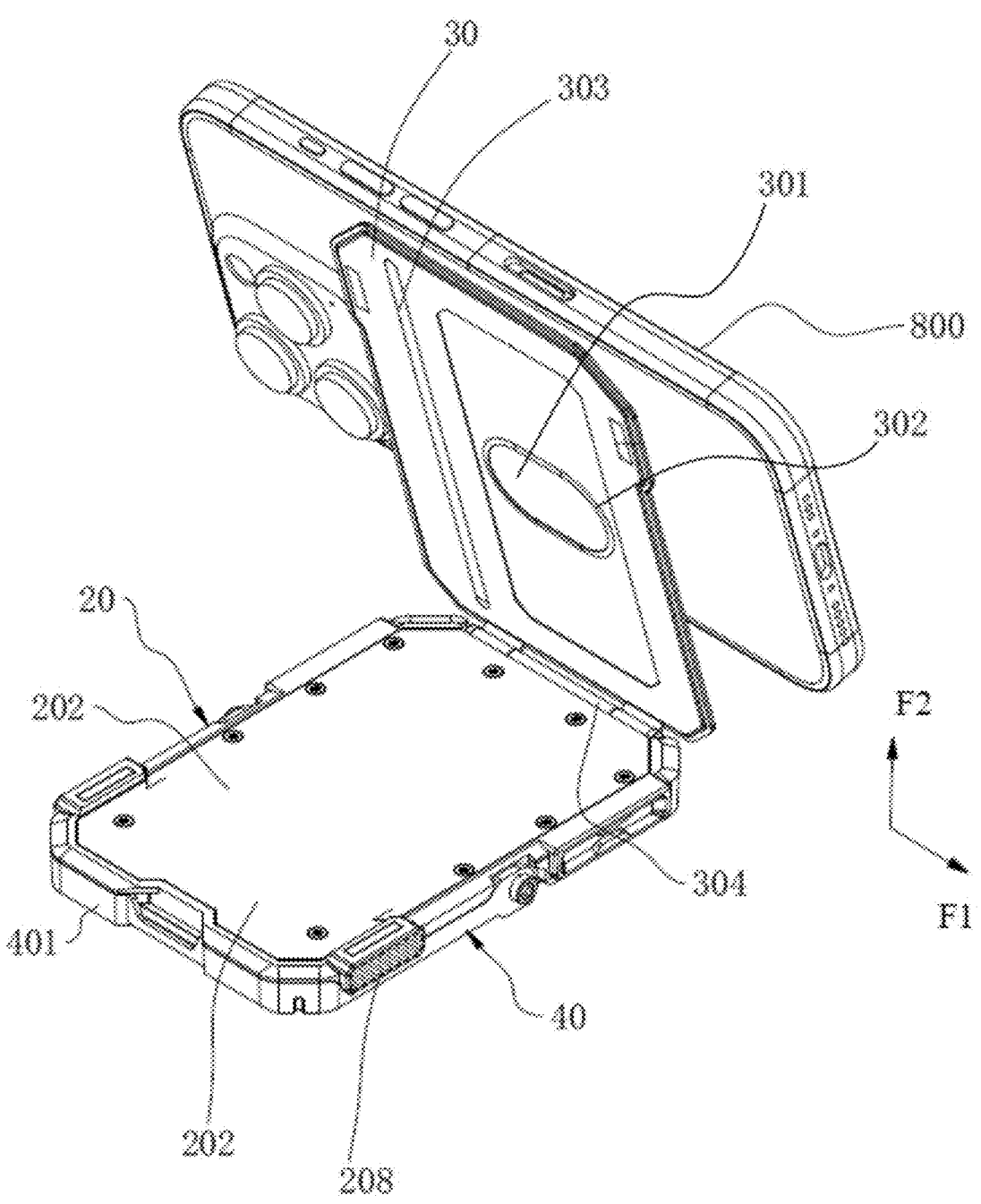
FIG. 5 is a three-dimensional schematic diagram of the stand for mobile terminal of FIG. 1 in a second support state.

In some embodiments, as shown in FIGS. 2 and 5, the stand for mobile terminal 100 includes a first support state and a second support state. In the first support state, the second support 30 is in the first unfolded position, and the third support 40 is in the second unfolded position, with the first angle α being an obtuse angle and the second angle β being an acute angle. In the second support state, the second support 30 is in the first unfolded position, and the third support 40 is in the second retracted position, with the first angle α being an acute angle.

It should be understood that the first unfolded position and the second unfolded position are not fixed positions. Depending on the specific values of the first angle α and the second angle β, the positions and inclination angles of the first unfolded position and the second unfolded position will also change accordingly.

Figure 6:
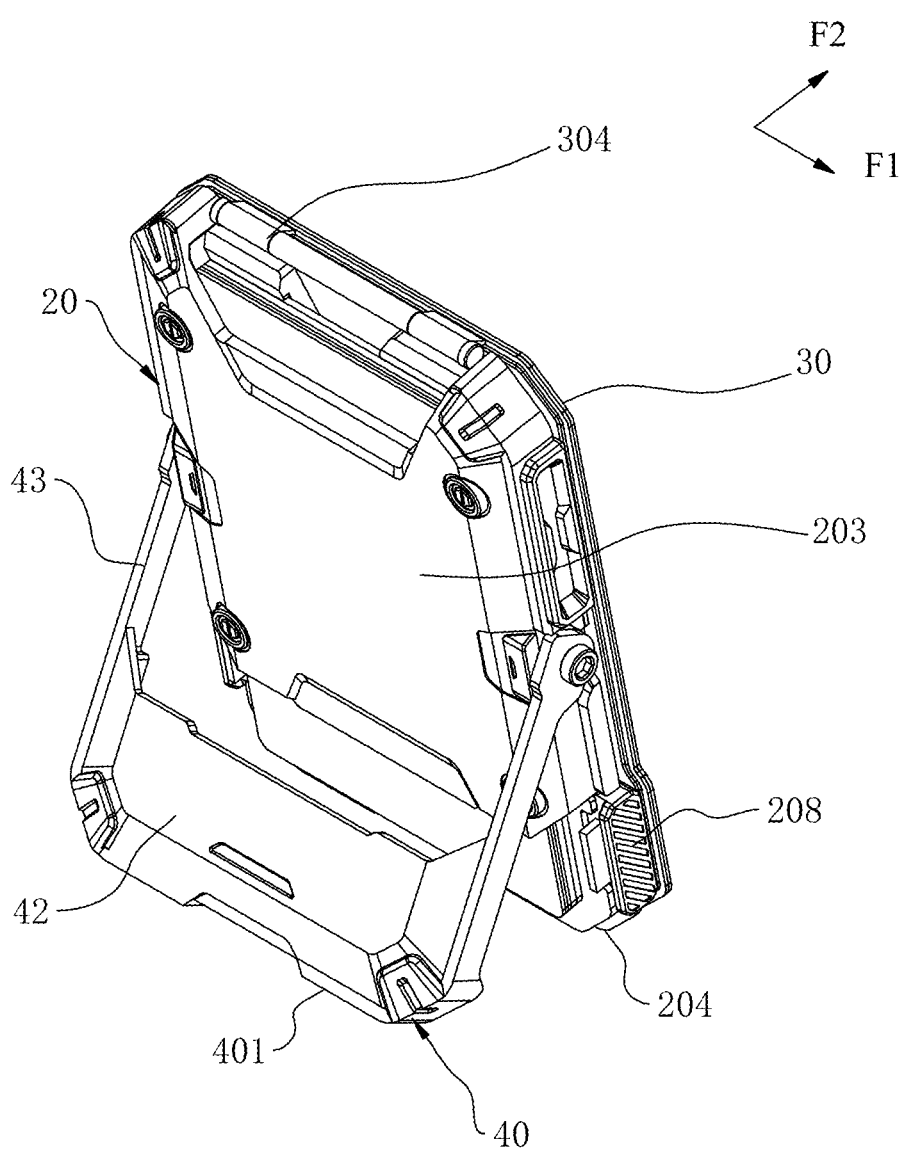
FIG. 6 is a three-dimensional schematic diagram of the stand for mobile terminal of FIG. 1 in a third support state.
Figure 7:
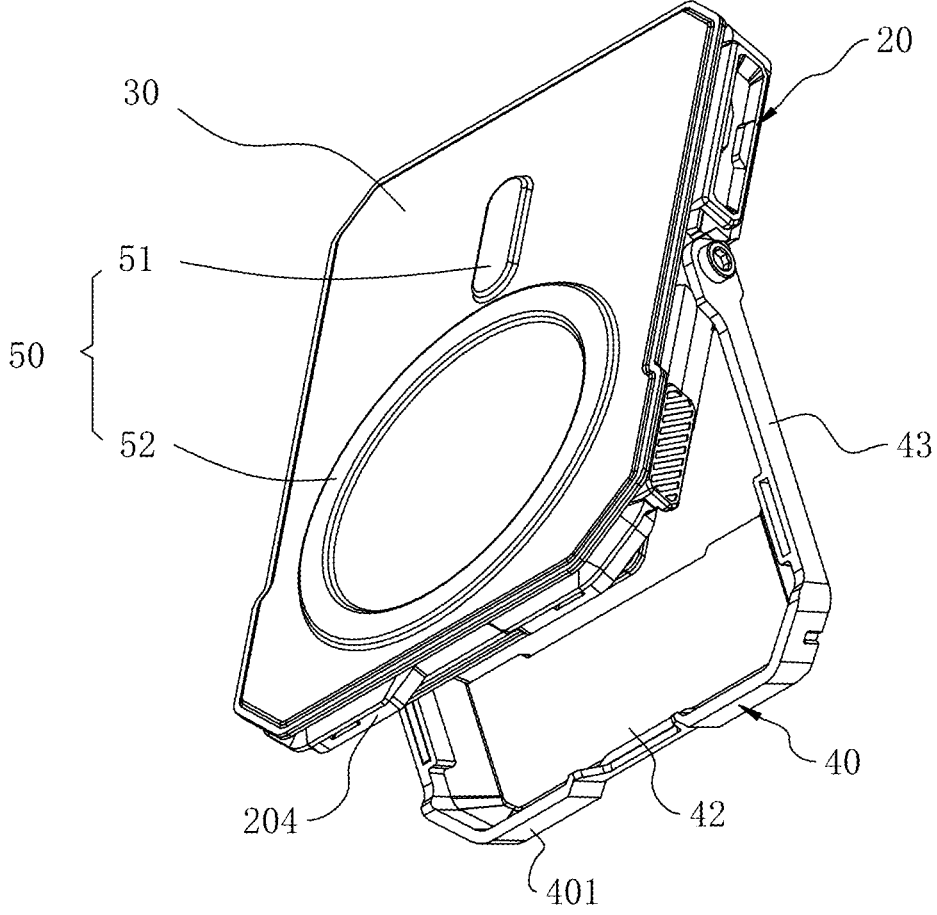
FIG. 7 is a three-dimensional schematic diagram of the stand for mobile terminal of FIG. 5 from another perspective.

In some embodiments, as shown in FIGS. 6 and 7, the stand for mobile terminal 100 further includes a third support state. In the third support state, the second support 30 is in the first retracted position and the third support 40 is in the second unfolded position. It should be understood that in this case, the second support 30 is at a relatively lower height, thereby supporting the mobile terminal device 800 at a lower height.

It should be understood that by changing the values of the first angle α and the second angle β, or by choosing whether the second support 30 and the third support 40 are in their respective deployed or retracted positions, the stand for mobile terminal 100 can have more support states.

Figure 8:
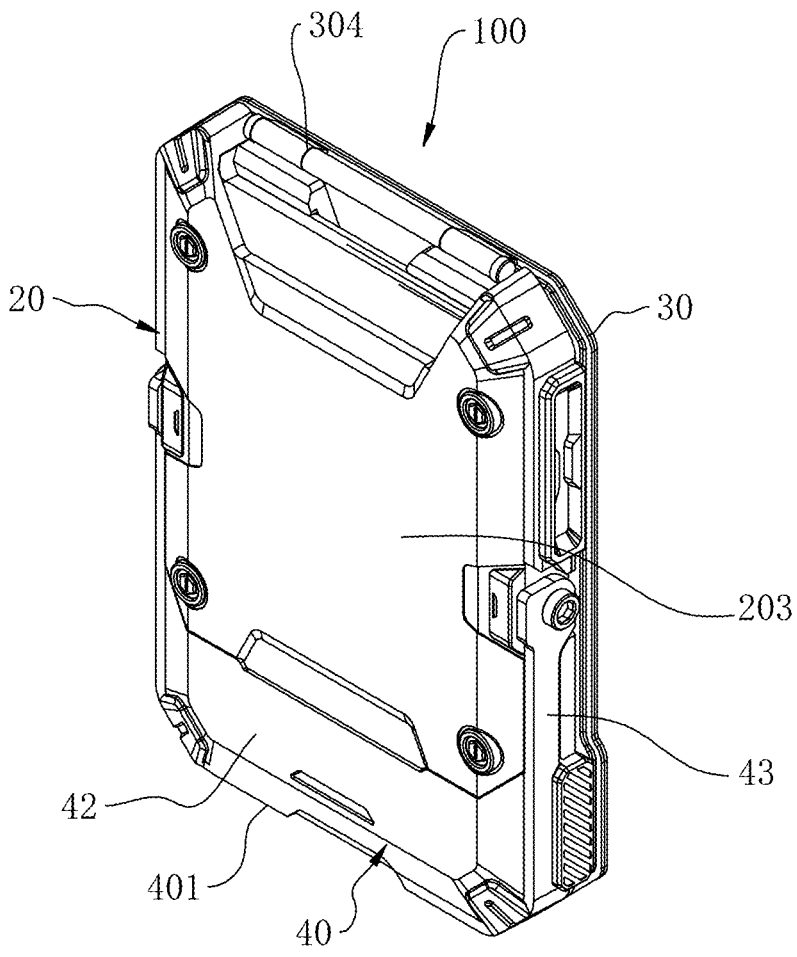
FIG. 8 is a three-dimensional schematic diagram of the stand for mobile terminal of FIG. 1 in a fully retracted state.

Exemplarily, as shown in FIG. 8, when the second support 30 is in the first retracted position and the third support 40 is in the second retracted position, the stand for mobile terminal 100 is in the fully retracted state, no longer in any support state. The stand 100 occupies a small space at this state, making it convenient for carrying, transportation, or storage.

In some embodiments, as shown in FIGS. 2 and 6, the first support 20 has a first end 204 and a second end 205 opposite to each other. When the third support 40 is in the second unfolded position, the end of the third support 40 away from the first support 20 forms a support end 401, which is spaced apart from the first end 204 of the first support 20. It should be understood that the support end 401 of the third support 40 and the first end 204 of the first support 20 cooperate to form a foot structure, allowing the third support 40 and the first support 20 to stand on a support plane.

In some embodiments, as shown in FIG. 2, the second support 30 is hinged to the second end 205 of the first support 20. The first end 204 and the second end 205 of the first support 20 face opposite directions. It should be understood that when the third support 40 and the first support 20 can stand on the support plane, since the second support 30 is hinged to the second end 205 of the first support 20, the second support 30 is effectively hinged to the upper end of the first support 20. When the second support 30 is connected to the mobile terminal device 800, it can place the mobile terminal device 800 at a higher support position, avoiding the inconvenience or cervical spine compression caused by the user looking down at the mobile terminal device 800.

It should be understood that the second support 30 is not limited to being hinged to the second end 205 of the first support 20.

In some embodiments, as shown in FIGS. 4 to 6, the first support 20 has a first surface 202 and a second surface 203, which face opposite directions along the thickness direction F2 of the first support 20.

It should be understood that in the first retracted position, the second support 30 is opposite to the first surface 202 of the first support 20. The first surface 202 and the second surface 203 are relatively oriented in a direction substantially perpendicular to the relative direction between the first end 204 and the second end 205.

Exemplarily, in the first retracted position, the second support 30 is in close contact with the first surface 202 of the first support 20.

Optionally, in the second retracted position, the third support 40 is in close contact with the second surface 203 of the first support 20. It should be understood that due to the third support 40 being supported by the second surface 203, the stability of the third support 40 in the second retracted position is improved, and the space occupied by the stand for mobile terminal 100 is reduced.

In some embodiments, as shown in FIG. 1, the first accommodation cavity 201 has a first cavity opening 206. It should be understood that the first cavity opening 206 serves as the entrance and exit for the card 900. When the third support 40 is in the second retracted position, the third support 40 at least partially covers the first cavity opening 206.

Optionally, the first cavity opening 206 is formed at the first end 204 of the first accommodation cavity 201.

In some embodiments, as shown in FIG. 5, the second support 30 is hinged to the first support 20 via a friction hinge 304, allowing the second support 30 to maintain a predetermined angle relative to the first support 20, such as the first unfolded position.

Figure 14:
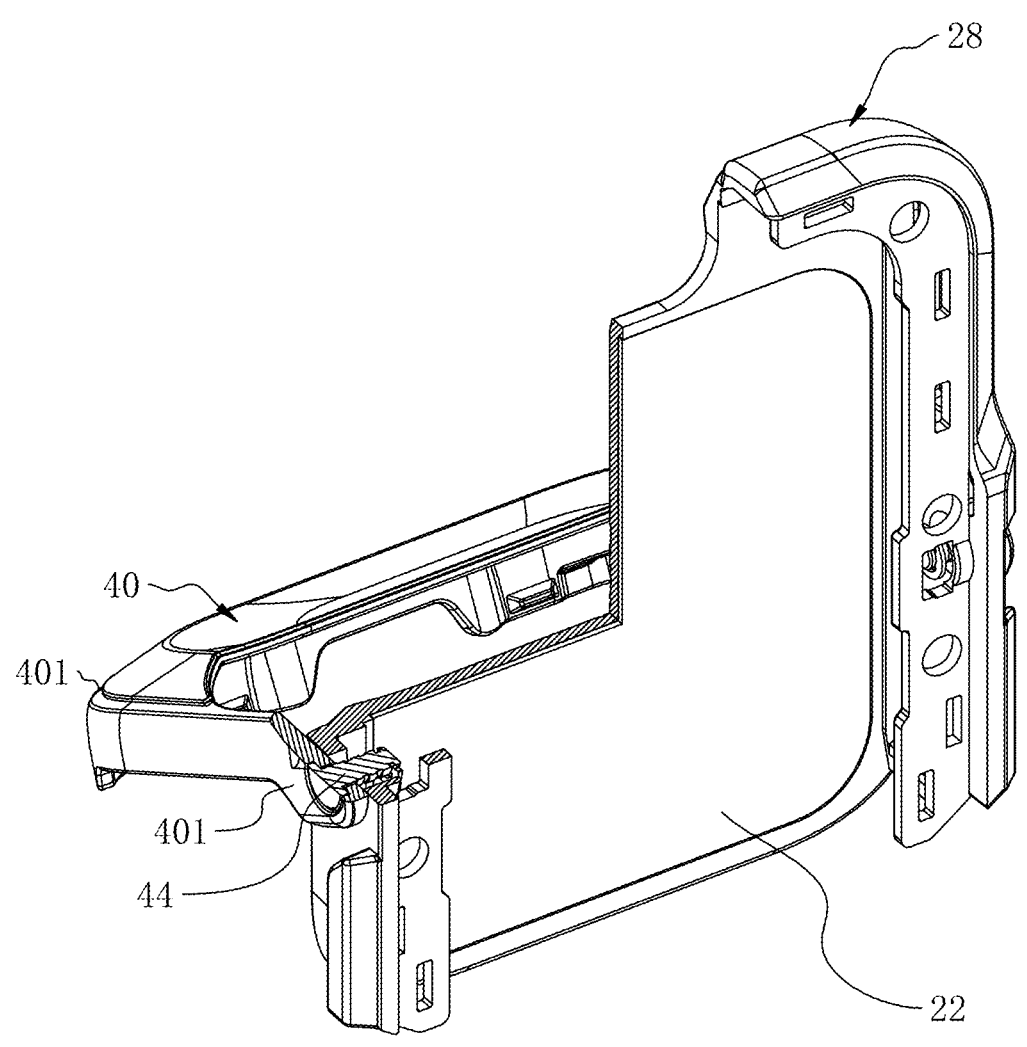
FIG. 14 is a partial three-dimensional schematic diagram of the shell and support body of the stand for mobile terminal of FIG. 9.
Figure 15A:
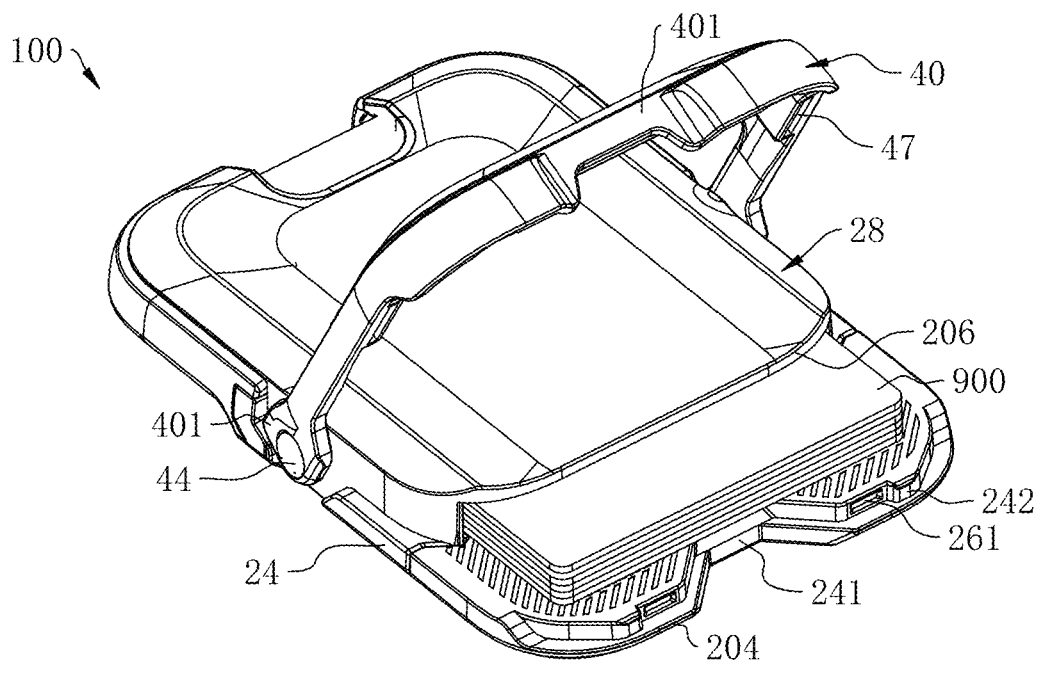
FIG. 15*a* is a usage state diagram of the stand for mobile terminal of FIG. 9.
Figure 15B:
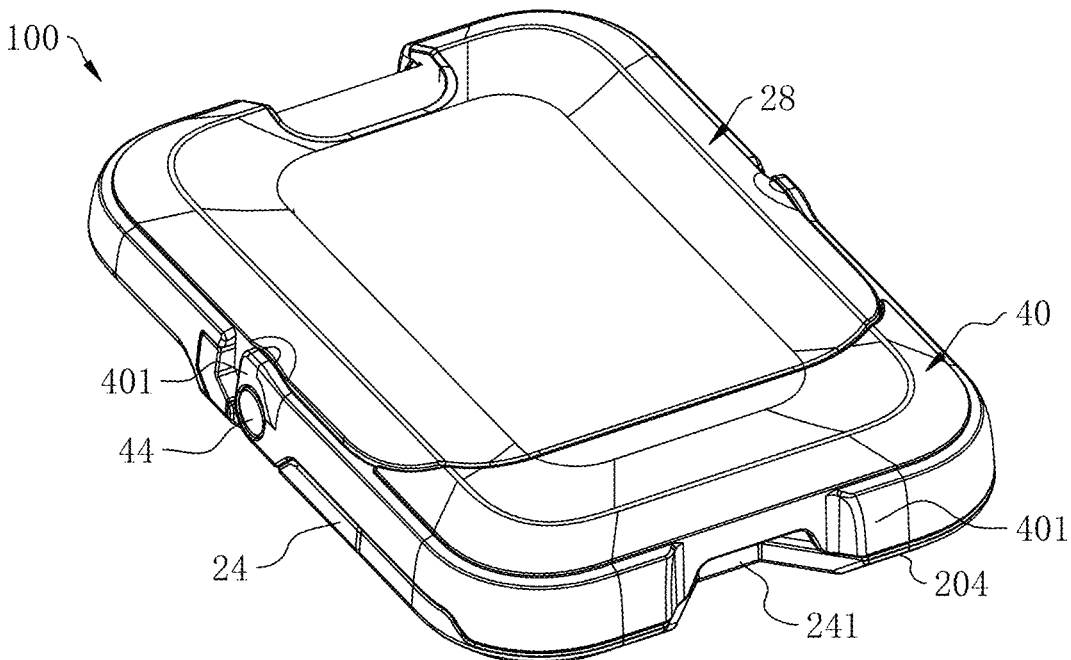
FIG. 15*b* is a usage state diagram of the stand for mobile terminal of FIG. 9.
Figure 16A:
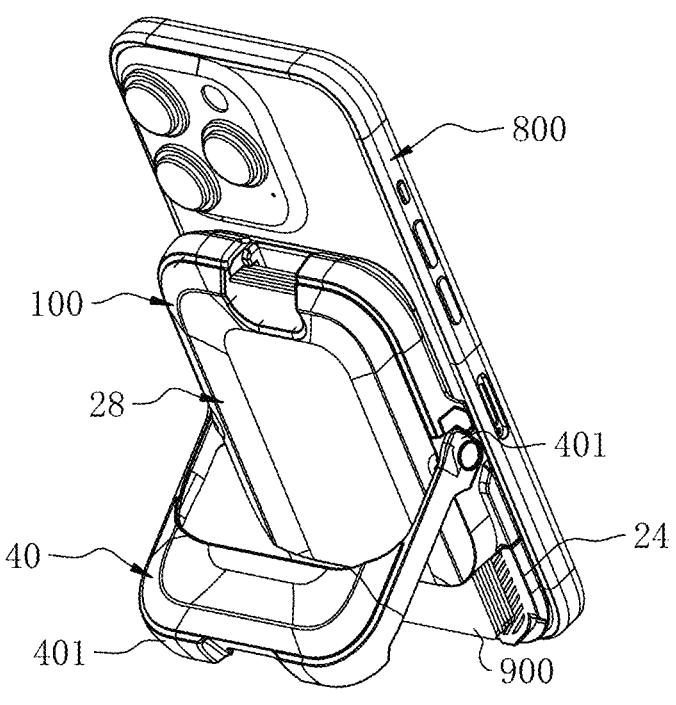
FIG. 16*a* is a usage state diagram of the stand for mobile terminal of FIG. 9.
Figure 16B:
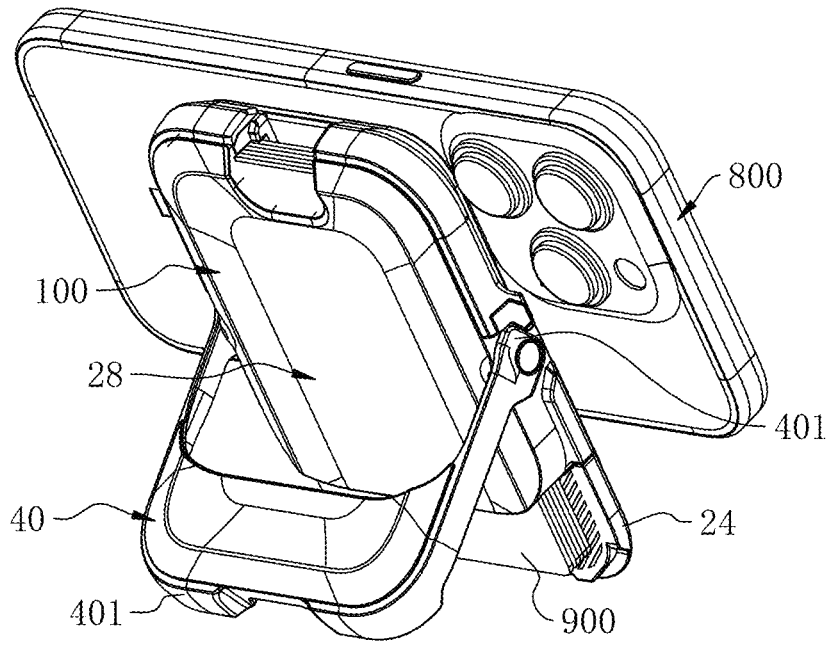
FIG. 16*b* is a usage state diagram of the stand for mobile terminal of FIG. 9.

In some embodiments, as shown in FIGS. 4 and 14, the stand for mobile terminal 100 further includes a pin 44. The pin 44 passes through the third support 40 and the first support 20 to achieve a hinge connection between the third support 40 and the first support 20.

Figure 11:
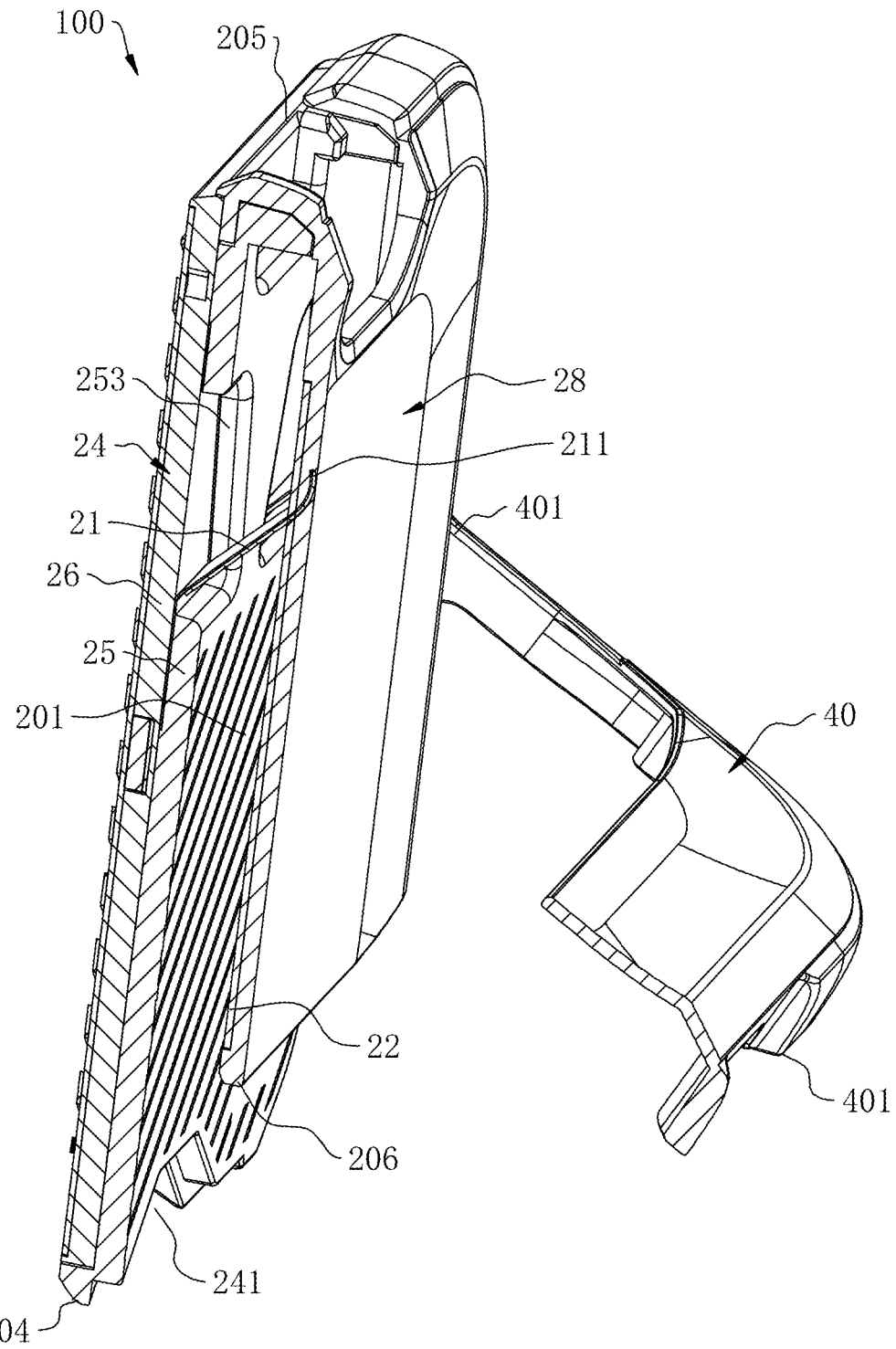
FIG. 11 is a three-dimensional sectional view of the stand for mobile terminal of FIG. 9.
Figure 13:
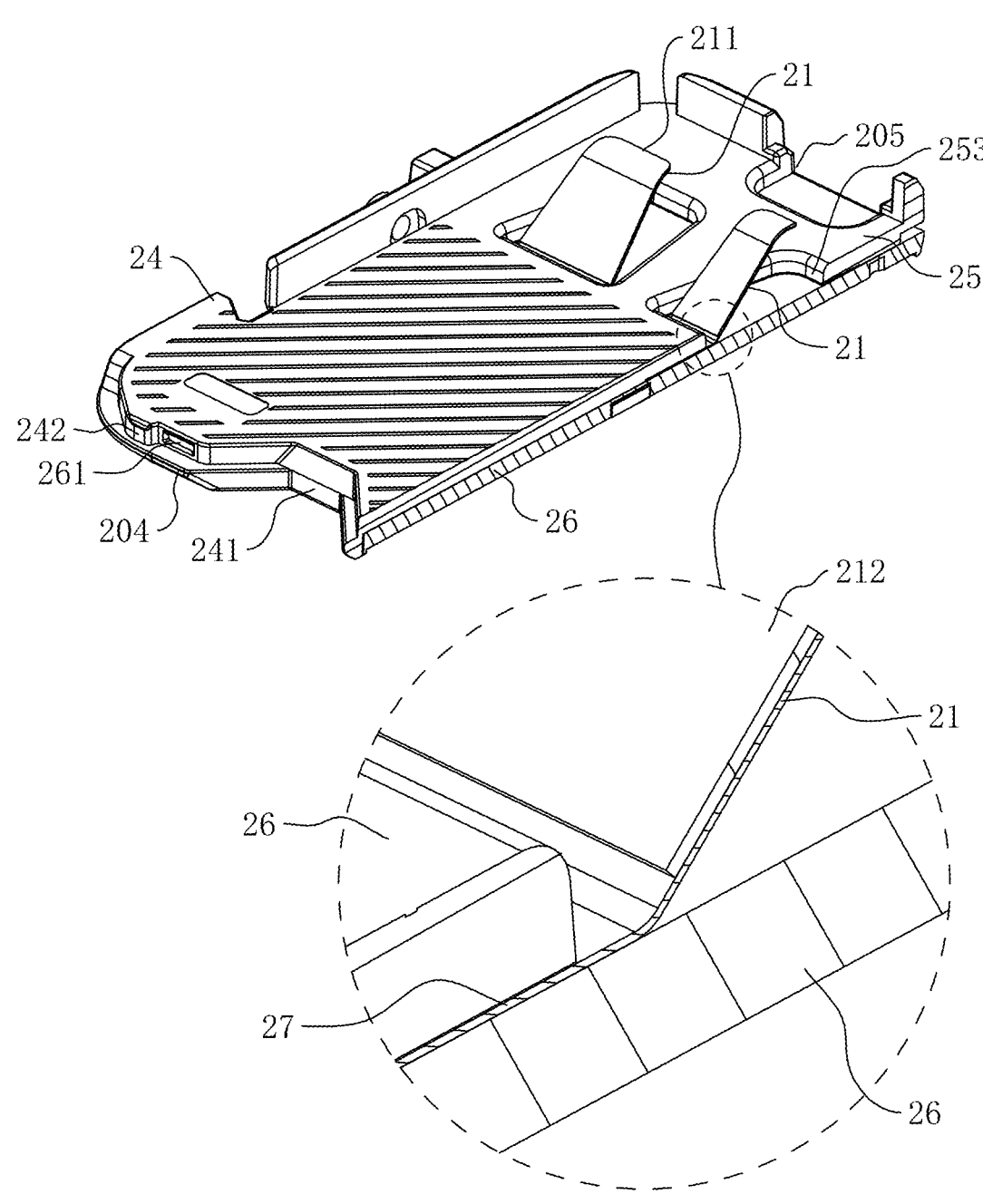
FIG. 13 is a three-dimensional sectional view of the main wall body and magnetic adsorption components of FIG. 12.

In some embodiments, as shown in FIGS. 11 and 13, the stand for mobile terminal 100 further includes a spring sheet 21 connected to the first support 20. The spring sheet 21 is movably accommodated in the first accommodation cavity 201. It should be understood that when a card 900 is inserted into the first accommodation cavity 201, the spring sheet 21 exerts a pushing force on the card 900, clamping one or more cards 900 between the spring sheet 21 and a part of the inner wall of the first accommodation cavity 201, preventing the card 900 from easily falling out and being lost.

Exemplarily, the spring sheet 21 has a free end 211 that is movably accommodated in the first accommodation cavity 201. When the card 900 is inserted into the first accommodation cavity 201, the card 900 is clamped between the free end 211 of the spring sheet 21 and a part of the inner wall of the first accommodation cavity 201.

Optionally, as shown in FIG. 13, the side of the spring sheet 21 that comes into contact with the card 900 is covered with a flexible pad 212.

Optionally, the spring sheet 21 is arranged in pairs to exert pressure on different positions of the same card 900.

In some embodiments, as shown in FIG. 11, the first support 20 has a first cavity opening 206 at the first end 204. In the free state of the spring sheet 21, along the direction from the first end 204 to the second end 205, the spring sheet 21 tilts away from the first surface 202. It should be understood that when the card 900 is inserted into the first accommodation cavity 201, the card 900 pushes the spring sheet 21, causing the spring sheet 21 to be pressed towards the first surface 202.

In some embodiments, as shown in FIG. 14, the stand for mobile terminal 100 further includes a shielding layer 22. The shielding layer 22 is arranged between the first accommodation cavity 201 and the second surface 203. It should be understood that the shielding layer 22 has high electrical conductivity and high magnetic permeability, effectively reflecting or absorbing radio waves emitted by RFID readers, thereby preventing RFID chips from being activated and read.

Figure 12:
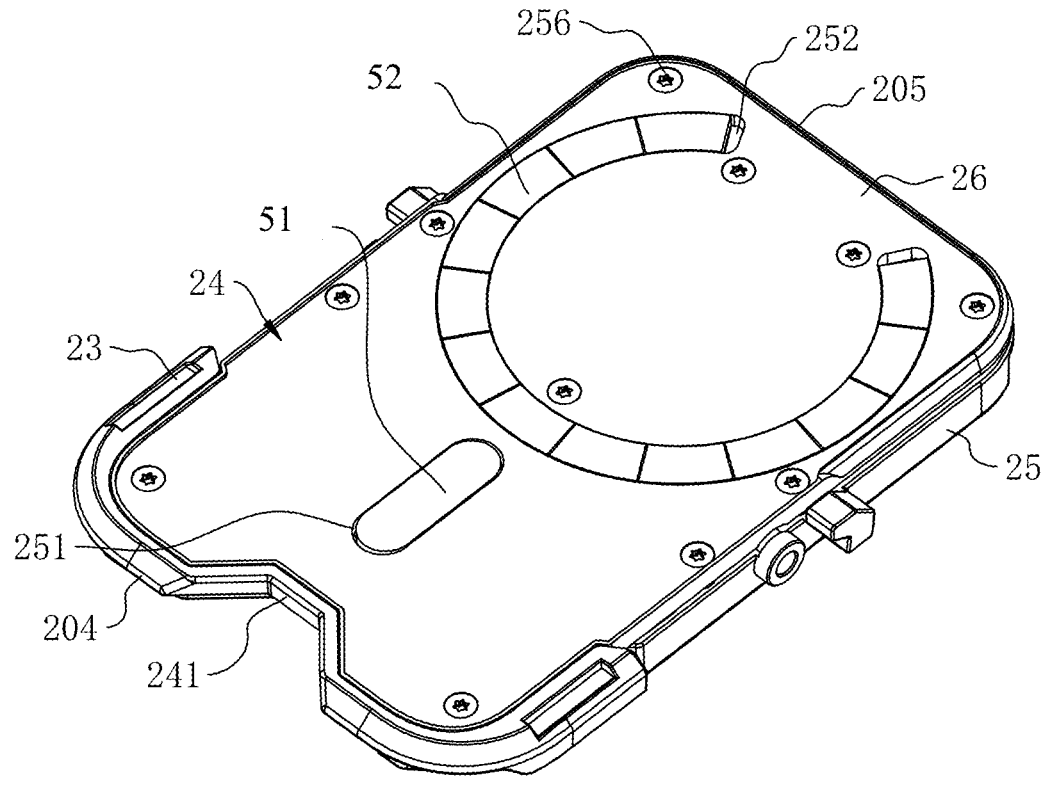
FIG. 12 is a three-dimensional schematic diagram of the main wall body and magnetic adsorption components of the stand for mobile terminal of FIG. 9.

In some embodiments, as shown in FIG. 12, the stand for mobile terminal 100 further includes at least two magnetic latch assemblies 23. One magnetic latch assembly 23 is connected to the first support 20, and the other is connected to the third support 40. When the third support 40 is in the second retracted position, the two magnetic latch assemblies 23 are magnetically coupled, which helps to reliably keep the third support 40 in the second retracted position. Since the third support 40 covers the first cavity opening 206 when in the second retracted position, the magnetic latch assemblies 23 ensure that the third support 40 remains in the second retracted position, preventing the card 900 from being lost due to the accidental opening of the first cavity opening 206.

In some embodiments, as shown in FIGS. 1 and 2, the first support 20 has an anti-slip structure 208 on at least one side in the width direction F1, making the stand for mobile terminal 100 less likely to slip from the user's hand. Exemplarily, the anti-slip structure 208 is a rubber pad or rubber block with texture.

In some embodiments, as shown in FIG. 1, the second support 30 is provided with a second accommodation cavity 301 for holding cards 900, allowing the second support 30 to accommodate cards 900.

It should be understood that the second accommodation cavity 301 has a second cavity opening 303 as the entrance and exit for the card 900.

Optionally, a main wall 305 bounding one side of the second accommodation cavity 301 has an observation window 302. The observation window 302 is spaced apart from the second cavity opening 303, thereby saving material for the second support 30 and facilitating the observation of the cards 900 inside the second accommodation cavity 301.

In some embodiments, as shown in FIG. 2, the third support 40 includes a support main body 42 and at least two hinge rods 43. One hinge rod 43 is connected to one side of the support main body 42 and is also hinged to one side of the first support 20 along the width direction F1. Another hinge rod 43 is connected to the other side of the support main body 42 and is also hinged to the other side of the first support 20 along the width direction F1.

Exemplarily, when the third support 40 is in the second retracted position, the support main body 42 covers the first cavity opening 206.

Exemplarily, the pin 44 passes through the hinge rod 43 and the first support 20. At least one of the hinge rod 43 and the first support 20 can relatively rotate around the pin 44 under frictional damping, allowing the third support 40 to maintain a predetermined angle relative to the first support 20, such as the second unfolded position.

Figure 3:
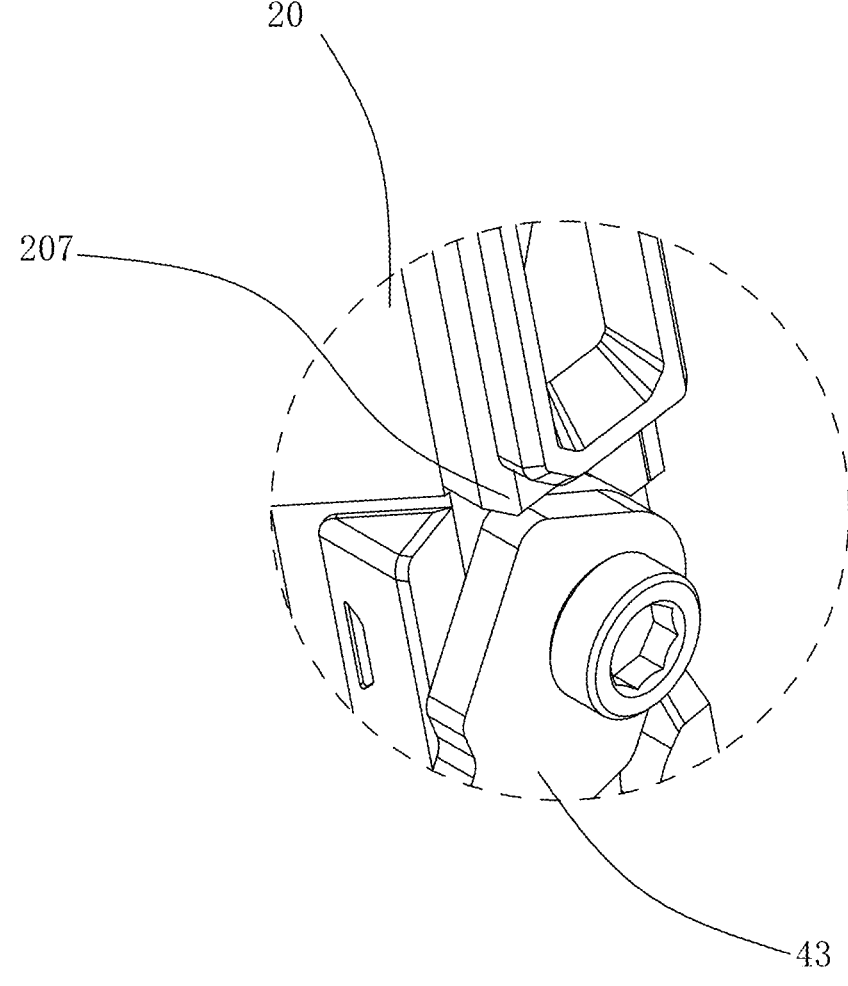
FIG. 3 is an enlarged view of area A of the stand for mobile terminal of FIG. 2.

In some embodiments, as shown in FIGS. 2 and 3, the first support 20 is provided with a stop structure 207. When the third support 40 is in the second unfolded position, at least one hinge rod 43 abuts against the stop structure 207, keeping the third support 40 in the second unfolded position.

Exemplarily, the stop structure 207 is a protrusion formed on the first support 20. Optionally, the stop structure 207 can also be a stop column, stop rod, etc.

Figure 9:
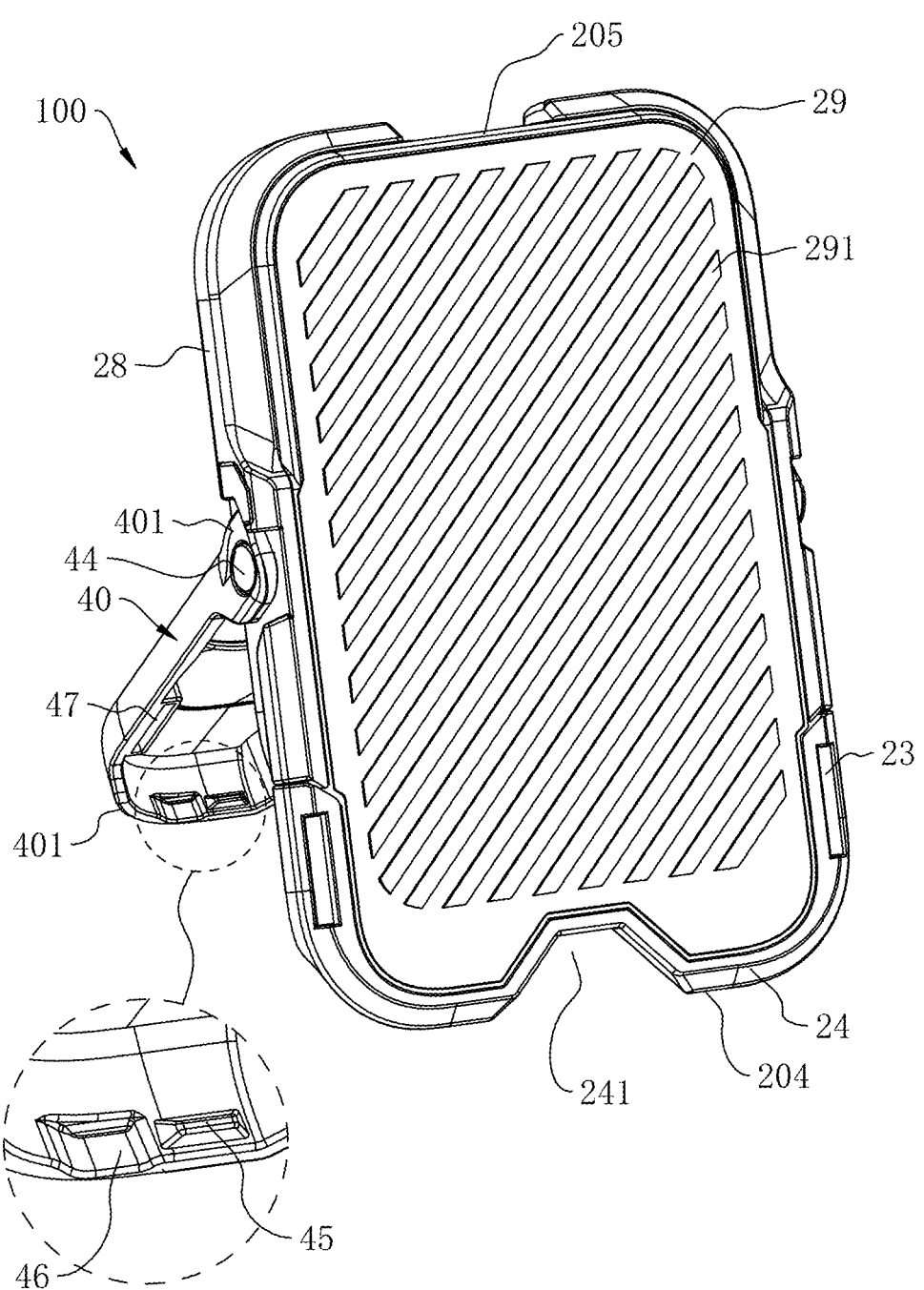
FIG. 9 is a three-dimensional schematic diagram of the stand for mobile terminal of another embodiment of the present disclosure.

In some embodiments, as shown in FIGS. 9 and 13, one of the first end 204 of the first support 20 and the third support 40 is provided with a locking tab 45, and the other is provided with a mating slot 261. When the third support 40 is in the second retracted position, the locking tab 45 is inserted into the mating slot 261, with the relative direction of the locking tab 45 and the mating slot 261 corresponding to the relative direction between the first end 204 and the second end 205. It should be understood that when the third support 40 is in the second retracted position, the insertion direction of the locking tab 45 relative to the mating slot 261 is substantially perpendicular to the rotation direction of the third support 40. Thus, the cooperation between the locking tab 45 and the mating slot 261 prevents the third support 40 from leaving the second retracted position, avoiding the loss of the card 900 due to the accidental opening of the third support 40.

In some embodiments, as shown in FIGS. 7 and 12, the fixing component 50 is a magnetic coupler that exerts a magnetic force on the mobile terminal device 800, keeping the mobile terminal device 800 firmly attached to the second support 30.

Optionally, the fixing component 50 includes a first magnetic coupler 51 and a second magnetic coupler 52. Exemplarily, when the mobile terminal device 800 is absorbed by the fixing component 50, the mobile terminal device 800 can be in a vertical or horizontal screen state. When the mobile terminal device 800 is in a vertical screen state, it forms magnetic coupling with both the first magnetic coupler 51 and the second magnetic coupler 52. When the mobile terminal device 800 is in a horizontal screen state, it forms magnetic coupling with one or several second magnetic couplers 52.

Exemplarily, the first magnetic coupler 51 is a magnetic block.

Exemplarily, a single second magnetic coupler 52 is a magnetic ring. Exemplarily, a single second magnetic coupler 52 has an arc-shaped or horseshoe-shaped structure.

Exemplarily, several second magnetic couplers 52 are distributed along an arc, with each second magnetic coupler 52 adsorbing a different position of the mobile terminal device 800. Exemplarily, several second magnetic couplers 52 are arranged in a circular or matrix pattern.

Optionally, the distribution area of one or several second magnetic couplers 52 is larger than that of the first magnetic coupler 51.

In other embodiments, the fixing component 50 can also be a structure for clamping or snapping the mobile terminal device 800.

Figure 10:
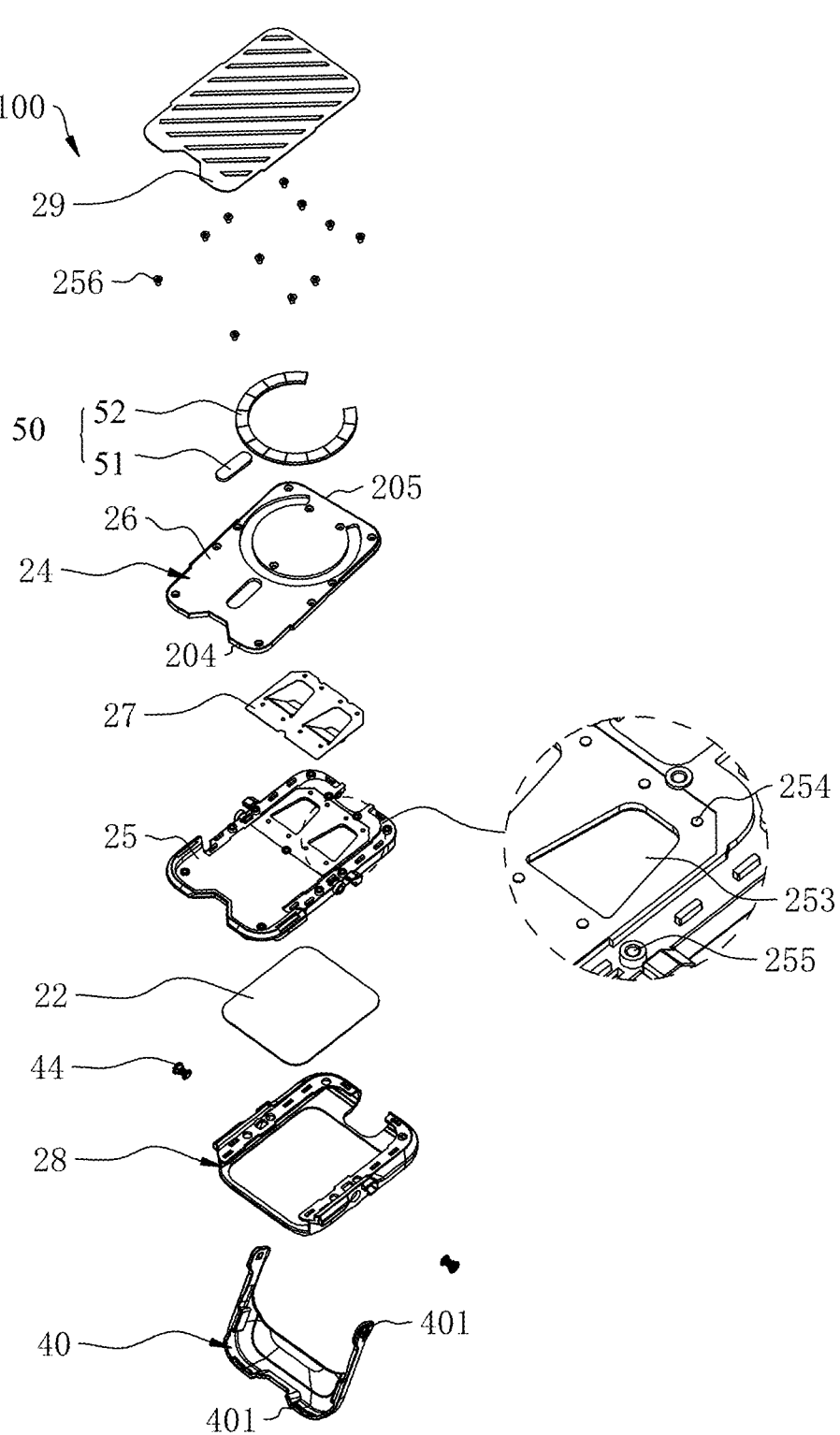
FIG. 10 is an exploded view of the stand for mobile terminal of FIG. 9.

In some embodiments, as shown in FIGS. 9 to 11, the first support 20 includes a main wall body 24 and a shell 28 connected to one side of the main wall body 24. The shell 28 and the main wall body 24 together define the first accommodation cavity 201. Exemplarily, the shell 28 and the main wall body 24 jointly form the first accommodation cavity 201.

Exemplarily, as shown in FIG. 11, along the relative direction between the second end 205 and the first end 204, the length of the shell 28 is shorter than that of the main wall body 24.

Optionally, as shown in FIGS. 9 and 12, the main wall body 24 forms the first end 204 and the second end 205 of the first support 20. The main wall body 24 has a first recess 241 at the middle of the first end 204. The shell 28, together with the main wall body 24, defines the first cavity opening 206, which faces the first recess 241. It should be understood that when it is necessary to remove the card 900, the user's finger can access the card 900 near the main wall body 24 through the first recess 241. The side of the card 900 facing away from the main wall body 24 is not covered by the third support 40. Thus, the user can hold the card 900 from both sides and pull it out of the first accommodation cavity 201.

Figure 17:
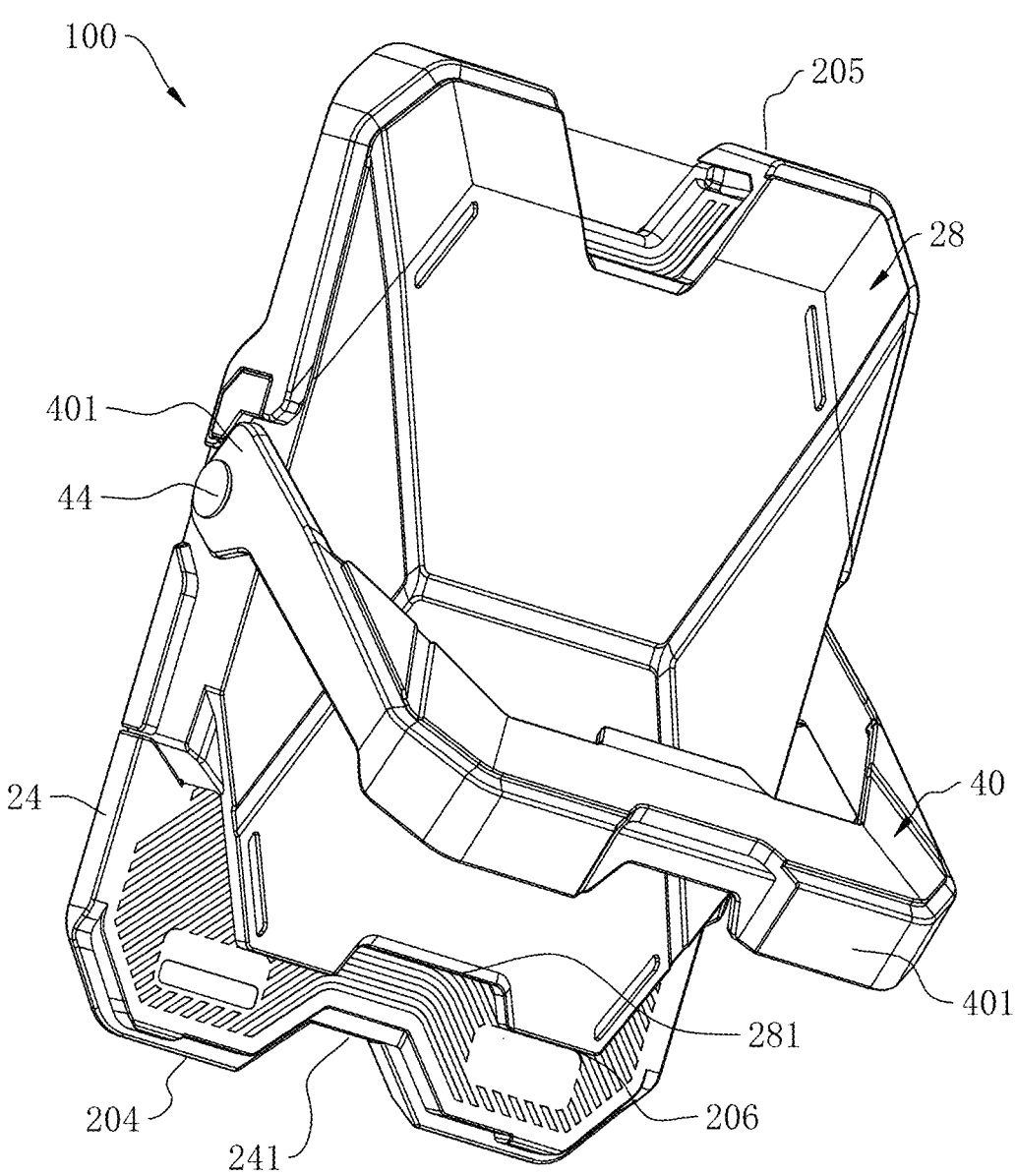
FIG. 17 is a three-dimensional schematic diagram of the stand for mobile terminal of another embodiment.

Optionally, as shown in FIG. 17, the shell 28 has a second recess 281 at the edge of the first cavity opening 206, facilitating the removal of the card 900 far from the main wall body 24.

Exemplarily, as shown in FIG. 9, the pin 44 passes through the middle part of the shell 28 between the first end 204 and the second end 205.

Exemplarily, the main wall body 24 is provided with a locking tab 45 or a mating slot 261 at the first end 204.

Optionally, the third support 40 is integrally connected with dual trunnion mounts. The dual trunnion mounts attached to the third support 40 are provided opposite each other, and are rotatably inserted on both sides of the shell 28.

For simplification of description and ease of understanding, the magnetic latch assembly 23 connected to the first support 20 is referred to as the first magnetic latch assembly 23, and the magnetic latch assembly 23 connected to the third support 40 is referred to as the second magnetic latch assembly 23.

Exemplarily, the distance between the first magnetic latch assembly 23 and the first end 204 is shorter than the distance between the first magnetic latch assembly 23 and the second end 205. Optionally, the distance between the second magnetic latch assembly 23 and the support end 401 is shorter than the distance between the second magnetic latch assembly 23 and the connecting end.

Exemplarily, as shown in FIG. 9, the third support 40 has a positioning slot 47. The second magnetic latch assembly 23 is accommodated within the positioning slot 47. Optionally, when in the second retracted position, the opening of the positioning slot 47 faces the main wall body 24.

In some embodiments, referring to FIG. 11, the shielding layer 22 is provided on a side of the first accommodation cavity 201 that is backed toward the main wall body 24. Optionally, a portion of the inner wall surface of the shell 28 faces towards the main wall body 24, and the shielding layer 22 covers that portion of the inner wall surface of the shell 28, and thus the shielding layer 22 is in the first accommodation cavity 201.

In some embodiments, as shown in FIGS. 9 and 13, one of the first end 204 of the main wall body 24 and the third support 40 is provided with a positioning block 242, and the other one is provided with a positioning slot 46. When the third support 40 is in the second retracted position, the positioning block 242 is accommodated within the positioning slot 46. When the third support 40 is in the second unfolded position, the positioning block 242 is outside of the positioning slot 46. During the process of the third support 40 rotating from the second unfolded position to the second retracted position, the positioning block 242 slides into the positioning slot 46.

Exemplarily, as shown in FIGS. 11 and 13, the spring sheet 21 is connected to the main wall body 24. In the free state of the spring sheet 21, along the direction from the first end 204 to the second end 205 of the main wall body 24, the spring sheet 21 tilts away from the main wall body 24.

In other embodiments, the spring sheet 21 is connected to the shell 28. In the free state of the spring sheet 21, along the direction from the first end 204 to the second end 205, the spring sheet 21 tilts towards the main wall body 24.

In some embodiments, as shown in FIGS. 10 and 13, the main wall body 24 includes an inner wall plate 25, an outer wall plate 26 connected to the inner wall plate 25, and an installation plate 27 integrally connected to the spring sheet 21. The outer wall plate 26 is arranged on the side of the inner wall plate 25 opposite to the first accommodation cavity 201. The installation plate 27 is located between the inner wall plate 25 and the outer wall plate 26. One end of the spring sheet 21 is connected to the installation plate 27. The inner wall plate 25 has a through slot 253 through which the spring sheet 21 passes.

Optionally, the shell 28 is snap-fitted to the inner wall plate 25. Optionally, the shell 28 surrounds part of the edge of the inner wall plate 25.

Specifically, as shown in FIG. 11, in the free state of the spring sheet 21, along the direction from one end to the other end of the spring sheet 21, the spring sheet 21 gradually approaches the second end 205 of the main wall body 24 and the inner wall of the shell 28 facing the main wall body 24.

Exemplarily, as shown in FIG. 10, the inner wall plate 25 has a protrusion 254 on the side facing the outer wall plate 26. The protrusion 254 is inserted into the installation plate 27.

Exemplarily, as shown in FIG. 10, the inner wall plate 25 has a screw hole 255. A fastener 256 passes through the outer wall plate 26 and is screwed into the screw hole 255 of the inner wall plate 25.

In some embodiments, as shown in FIGS. 9 to 11 and FIGS. 15a to 16b, the stand for mobile terminal 100 includes the first support 20 and the third support 40. The first support 20 is connected with a fixing component 50. It should be understood that when the third support 40 is in the second retracted position, the stand for mobile terminal 100 is in the fully retracted state.

Exemplarily, as shown in FIG. 12, the fixing component 50 is connected to the main wall body 24. It should be understood that one side of the main wall body 24 is backed to the first accommodation cavity 201, and the mobile terminal device 800 is affixed to that side of the main wall body 24 under the magnetic force of the fixing component 50.

In some embodiments, the first magnetic coupler 51 and the second magnetic coupler 52 are respectively connected to the main wall body 24. The first magnetic coupler 51 is closer to the first end 204 of the main wall body 24 compared to the several second magnetic couplers 52.

In some embodiments, the main wall body 24 has a first positioning slot 251 on the side opposite to the shell 28, and the first magnetic coupler 51 is accommodated within the first positioning slot 251.

In some embodiments, the main wall body 24 has a second positioning slot 252 on the side opposite to the shell 28, and the second magnetic coupler 52 is accommodated within the second positioning slot 252. Exemplarily, the second positioning slot 252 is arc-shaped or ring-shaped, with several second magnetic couplers 52 accommodated within it.

In some embodiments, as shown in FIGS. 9 to 11, the stand for mobile terminal 100 further includes a cushion layer 29. The cushion layer 29 covers the side of the main wall body 24 opposite to the first accommodation cavity 201. The side of the cushion layer 29 opposite to the main wall body 24 has anti-slip protrusions 291.

The above embodiments are merely exemplary descriptions of the preferred embodiments of the present disclosure and do not limit the scope of the present disclosure. Any deformation and improvement made by those skilled in the art within the spirit of the present disclosure, without departing from the scope of the claims of the present disclosure, shall fall within the protection scope of the present disclosure.

What is claimed is:

1. A stand for mobile terminal, comprising:
a first support, defining a first accommodation cavity for holding cards;
a second support, pivotally connected to the first support, and being pivotable relative to the first support between a first unfolded position and a first retracted position; wherein in the first unfolded position, the second support forms a first angle with the first support; in the first retracted position, an angle between the second support and the first support is smaller than the first angle; the second support comprises a fixing component for securing a mobile terminal device; and
a third support, pivotally connected to the first support, and capable of being positioned relative to the first support in a second unfolded position and a second retracted position;
wherein in the second unfolded position, the third support forms a second angle with the first support; in the second retracted position, an angle between the third support and the first support is less than the second angle;
wherein the stand for mobile terminal further comprises a first support state and a second support state; in the first support state, the second support is in the first unfolded position, and the third support is in the second unfolded position, and the first angle is an obtuse angle and the second angle is an acute angle; in the second support state, the second support is in the first unfolded position, and the third support is in the second retracted position, and the first angle is an acute angle; and
wherein the stand for mobile terminal further comprises a third support state, in the third support state, the second support is in the first retracted position and the third support is in the second unfolded position.

2. The stand for mobile terminal of claim 1, wherein the first support comprises a first end and a second end opposite to each other; when the third support is in the second unfolded position, an end of the third support away from the first support is configured as a support end that is spaced apart from the first end of the first support.

3. The stand for mobile terminal of claim 2, wherein the second support is pivotally connected to the second end of the first support, and the first end and the second end of the first support face opposite directions.

4. The stand for mobile terminal of claim 1, wherein the first support comprises a first surface and a second surface which face opposite directions along a thickness direction of the first support; in the first retracted position, the second support is in close contact with the first surface of the first support.

5. The stand for mobile terminal of claim 4, wherein in the second retracted position, the third support is in close contact with the second surface of the first support.

6. The stand for mobile terminal of claim 1, wherein the first accommodation cavity comprises a first cavity opening; in the second retracted position, the third support at least partially covers the first cavity opening.

7. The stand for mobile terminal of claim 1, wherein the second support defines a second accommodation cavity therein for holding another card with a second cavity opening as an entrance and exit for the another card; and wherein a main wall bounding one side of the second accommodation cavity has an observation window, and the observation window is spaced apart from the second cavity opening.

8. The stand for mobile terminal of claim 1, wherein the third support comprises a support main body and at least two hinge rods; one of the at least two hinge rods is pivotally connected on one side of the first support along its width direction, another hinge rod is pivotally connected to another side of the first support along its width direction.

9. The stand for mobile terminal of claim 8, wherein the first support comprises a stop structure; when the third support is in the second unfolded position, at least one hinge rod abuts against the stop structure to keep the third support in the second unfolded position.

10. The stand for mobile terminal of claim 8 further comprising pins, wherein each of the pins passes through a corresponding hinge rod and the first support, at least one of the hinge rods and the first support is capable of rotating relative to the pin under frictional damping.

11. The stand for mobile terminal of claim 1 further comprising a spring sheet connected to the first support, wherein the spring sheet comprises a free end that is movably accommodated in the first accommodation cavity.

12. The stand for mobile terminal of claim 11, wherein the first support comprises a first surface and a second surface which face opposite directions along a thickness direction of the first support, the first support comprises a first end and a second end opposite to each other; the first support comprises a first cavity opening at the first end; in a free state of the spring sheet, along the direction from the first end to the second end, the spring sheet tilts away from the first surface.

13. The stand for mobile terminal of claim 1 further comprising a shielding layer, wherein the first support comprises a first surface and a second surface which face opposite directions along a thickness direction of the first support, in the first retracted position, the second support is opposite to the first surface of the first support, the shielding layer is arranged between the first accommodation cavity and the second surface.

14. The stand for mobile terminal of claim 1 further comprises at least two magnetic latch assemblies, wherein one of the at least two magnetic latch assemblies is connected to the first support, and another one of at least two magnetic latch assemblies is connected to the third support; when the third support is in the second retracted position, the two magnetic latch assemblies are magnetically coupled.

15. The stand for mobile terminal of claim 1, wherein the first support comprise a first end and a second end opposite to each other; one of the first end of the first support and the third support is connected with a locking tab, and the other is provided with a mating slot;

when the third support is in the second retracted position, the locking tab is inserted into the mating slot and a relative direction of the locking tab and the mating slot corresponds to a relative direction between the first end and the second end.

16. The stand for mobile terminal of claim 1, wherein the second support is pivotally connected to the first support via a friction hinge.

17. The stand for mobile terminal of claim 1, wherein the fixing component is a magnetic coupler.

18. The stand for mobile terminal of claim 1, wherein at least one side of the first support in the width direction is provided with an anti-slip structure.

19. A stand for mobile terminal, comprising:
a first support, defining a first accommodation cavity for holding cards;
a second support, pivotally connected to the first support, and being pivotable relative to the first support between a first unfolded position and a first retracted position; wherein in the first unfolded position, the second support forms a first angle with the first support; in the first retracted position, an angle between the second support and the first support is smaller than the first angle; the second support comprises a fixing component for securing a mobile terminal device; and
a third support, pivotally connected to the first support, and capable of being positioned relative to the first support in a second unfolded position and a second retracted position;
wherein in the second unfolded position, the third support forms a second angle with the first support; in the second retracted position, an angle between the third support and the first support is less than the second angle;
wherein the first support comprises a first surface and a second surface which face opposite directions along a thickness direction of the first support; in the first retracted position, the second support is in close contact with the first surface of the first support; and
wherein in the second retracted position, the third support is in close contact with the second surface of the first support.

20. A stand for mobile terminal, comprising:
a first support, defining a first accommodation cavity for holding cards;
a second support, pivotally connected to the first support, and being pivotable relative to the first support between a first unfolded position and a first retracted position; wherein in the first unfolded position, the second support forms a first angle with the first support; in the first retracted position, an angle between the second support and the first support is smaller than the first angle; the second support comprises a fixing component for securing a mobile terminal device; and
a third support, pivotally connected to the first support, and capable of being positioned relative to the first support in a second unfolded position and a second retracted position;
wherein in the second unfolded position, the third support forms a second angle with the first support; in the second retracted position, an angle between the third support and the first support is less than the second angle;
wherein the third support comprises a support main body and at least two hinge rods; one of the at least two hinge rods is pivotally connected on one side of the first support along its width direction, another hinge rod is pivotally connected to another side of the first support along its width direction; and
wherein the first support comprises a stop structure; when the third support is in the second unfolded position, at least one hinge rod abuts against the stop structure to keep the third support in the second unfolded position.

* * * * *